United States Patent Office 3,272,694
Patented Sept. 13, 1966

3,272,694
SEVIN-LINDANE INSECTICIDAL FUMIGATING COMPOSITION AND METHOD
Gordon N. Emby, Northrand, Transvaal, Republic of South Africa, assignor to African Explosives and Chemical Industries Limited, Johannesburg, Transvaal, South Africa
No Drawing. Filed Apr. 26, 1963, Ser. No. 276,080
Claims priority, application Republic of South Africa, Apr. 27, 1962, 62/1,763
4 Claims. (Cl. 167—30)

This invention relates to new and improved insecticidal compositions comprising at least two active ingredients capable of being dispersed in the form of a smoke.

It is well known to provide fumigating compositions wherein the insecticidal active ingredient can be dispersed as a smoke. A common active ingredient is the gamma isomer of benzene hexachloride (hereinafter referred to as lindane). Unfortunately certain pests, such as *Cimex lectularius* (the so-called common bedbug) for example, have now developed resistance to lindane fumigating smoke.

During recent years many carbamate compounds have been found to be effective insecticides, including naphthyl and phenyl carbamates and particularly N-methyl-1-naphthyl carbamate (hereinafter referred to as Sevin). However, these carbamates are known to be unstable at quite moderate temperatures. In the case of the compound Sevin it becomes unstable at about 70° C., it melts at 142° C. and tends to flash (i.e., to catch fire) at temperatures from 193° C. upwards. Such temperatures are normally reached in vapourising Sevin in order to effect dispersion as a smoke. It will be understood, therefore, that it is difficult to vapourise such a composition without an unduly high proportion thereof decomposing.

According to this invention, there is provided an insecticidal composition including a major quantity of one or more insecticidally active naphthyl or phenyl carbamates and a minor quantity of lindane.

The insecticidal composition according to the invention may conveniently include also a deflagration composition, an extender, and a binder. In this case, the insecticidal composition may be provided in powder or tablet form.

The insecticidally active naphthyl or phenyl carbamate may advantageously be the compound generally known as Sevin.

Compositions suitable for deflagration purposes include potassium chlorate and thiourea. As a binder a small proportion of shellac may be used. Gypsum may conveniently be used as the extender. An advantage of gypsum as the extender is that flaming, which may occur when smouldering is initiated, is momentary only with gypsum, whereas with other extenders, acceptable on economic grounds, such as kaolin for example, the flaming tendency, which may lead to substantial decomposition of the Sevin, is significantly greater.

It has been found that the combustion temperature for compositions of the type described above is approximately 260° C. which is well above the normal decomposition temperature of Sevin.

The following is an example of a composition according to the present invention which results in the release of 3.5 grams of Sevin and 1.6 grams of lindane per 1000 cubic feet of room space to be fumigated and which effects a substantially complete kill of *Cimex lectularius*:

| Ingredient: | Percent by weight |
|---|---|
| Technical Sevin | 28.0 |
| Lindane | 12.0 |
| Potassium chlorate | 22.0 |
| Thiourea | 9.5 |
| Gypsum | 25.0 |
| Shellac | 3.5 |
| | 100.0 |

In the insecticidal compositions according to the invention not more than a minor proportion of the carbamate is decomposed when the temperature of the compositions is raised to a level where vapourisation of the active ingredients occurs.

I claim:
1. An insecticidal fumigating composition comprising as the active ingredients a major quantity of 1-naphthyl N-methyl carbamate, and a minor quantity of lindane.
2. An insecticidal fumigating composition which comprises the following ingredients in the following proportions:

| Ingredients: | Percent by weight |
|---|---|
| Technical Sevin | 28.0 |
| Lindane | 12.0 |
| Potassium chlorate | 22.0 |
| Thiourea | 9.5 |
| Gypsum | 25.0 |
| Shellac | 3.5 |
| | 100.0 |

3. A method of exterminating insects by fumigating them with an insecticidal fumigating composition according to claim 1.
4. An insecticidal fumigating composition comprising as the active ingredients a major quantity of 1-naphthyl N-methyl carbamate, and a minor quantity of lindane, and which includes also a deflagration composition consisting of potassium chlorate and thiourea, an extender consisting of gypsum, and a binder consisting of shellac.

References Cited by the Examiner

UNITED STATES PATENTS

| | | | |
|---|---|---|---|
| 1,864,754 | 6/1932 | Ogelsby et al. | 167—47 |
| 2,557,815 | 6/1951 | Wheelwright et al. | 167—40 |
| 3,009,855 | 11/1959 | Lambrech | 167—32 |
| 3,056,723 | 10/1962 | Galloway | 167—42 |

OTHER REFERENCES

Journal of Economic Entomology, vol. 42, No. 3, June 1949, pp. 436–438.

JULIAN S. LEVITT, *Primary Examiner.*

GEORGE A. MENTIS, *Assistant Examiner.*